UNITED STATES PATENT OFFICE.

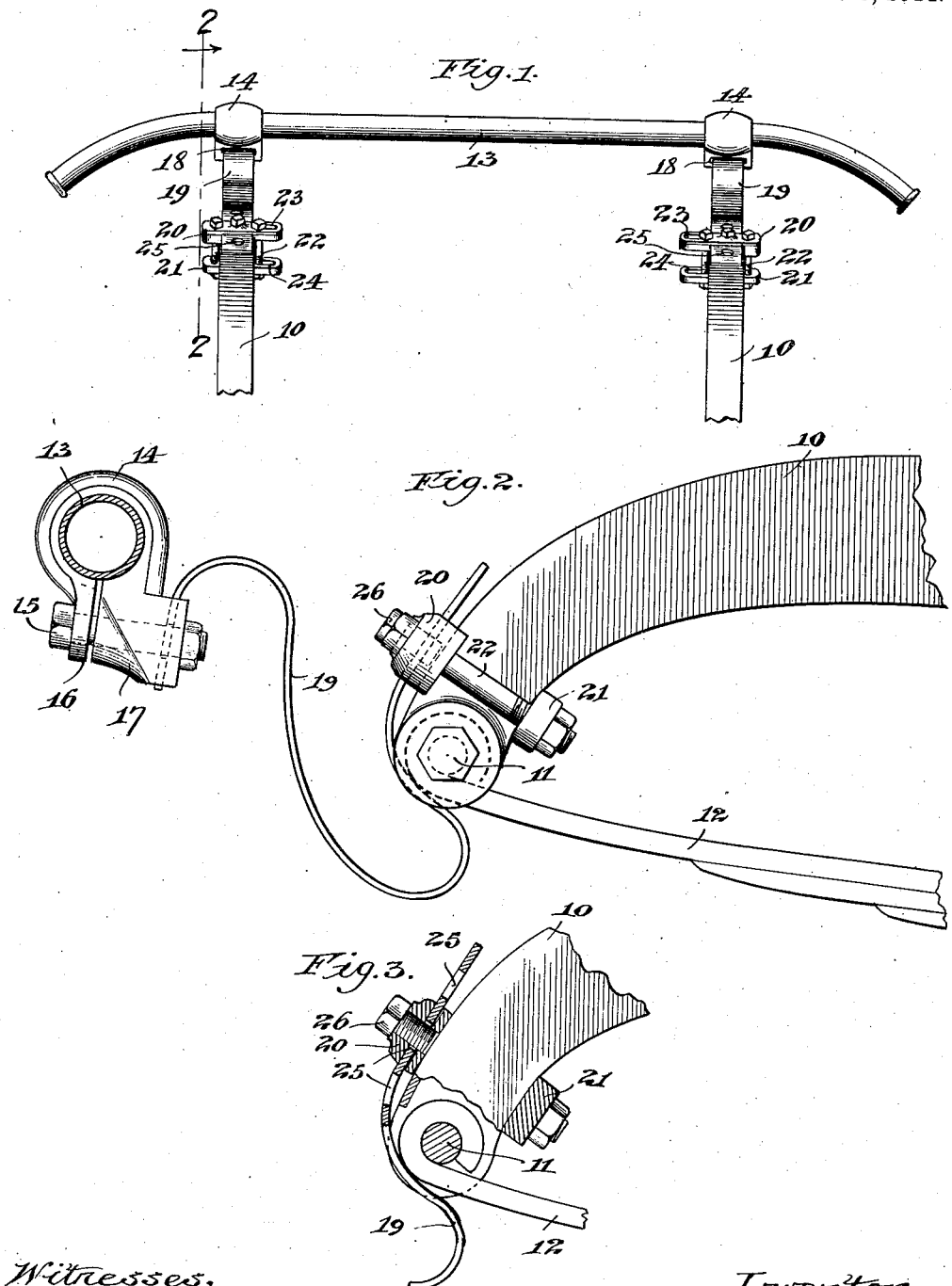

ALLAN L. McGREGOR, OF CHICAGO, ILLINOIS.

AUTOMOBILE-BUFFER.

1,010,661.

Specification of Letters Patent.

Patented Dec. 5, 1911.

Application filed July 20, 1910. Serial No. 572,831.

*To all whom it may concern:*

Be it known that I, ALLAN L. McGREGOR, a citizen of the United States, residing in Chicago, in the county of Cook and State of Illinois, have invented certain new and useful Improvements in Automobile-Buffers, of which the following is a specification.

This invention relates to buffers for use on automobiles to protect the more exposed parts and accessories at the forward end of the machine from the injurious or destructive effects of accidental collisions, and the invention has reference more particularly to that type of buffer now extensively employed wherein a horizontally disposed buffer-bar or impact-rail is yieldably mounted upon and in advance of the forwardly projecting portions of the frame and springs of the vehicle.

The invention has for its chief objects to provide a simpler and cheaper construction than those now in use; to provide a construction capable of ready attachment to and detachment from the machine, and without involving the drilling of bolt holes or other alteration or weakening of the machine frame for its attachment; and to provide a mounting and support for the buffer-bar capable of cushioning the latter against strains from practically any direction.

Other minor objects and advantages served by the invention will be apparent from the following description, taken in connection with the accompanying drawings, wherein—

Figure 1 is a top plan view of my improved automobile buffer, showing the same as mounted on the forward end of the vehicle frame. Fig. 2 is an enlarged cross-sectional view on the line 2—2 of Fig. 1, looking in the direction indicated by the arrow. Fig. 3 is a detail view partly in vertical section and partly in side elevation illustrating the manner and means of attaching the spring-supporting and carrying arms of the buffer-bar to the forward end of the vehicle frame.

Referring to the drawing, 10 designates the forwardly and downwardly curved end portions of the usual side bars or sills of the frame, to the forward ends of which are pivoted, by bolts 11, the usual forward semi-elliptic springs 12.

13 designates the buffer-bar which is in the usual form, the same being directly mounted in split collars 14 adapted to be clamped upon the bar 13 at the proper points thereon according to the width of the frame of the particular vehicle to which the device is applied. Collars 14 are clamped upon the bar 13 by clamp-bolts 15 passing through apertured depending lugs 16 and 17 on said collars. Each lug 17 is vertically slotted or socketed, as shown at 18, to receive the forward downwardly turned end of S-shaped leaf springs 19; these springs 19 constituting supporting and carrying arms for the buffer-bar, and thus combining the functions both of supporting and carrying means and cushioning means for the buffer-bar. The upwardly turned rear end portions of the springs 19 are suitably and preferably adjustably attached to the forwardly projecting portion of the vehicle frame; the means herein shown for this purpose comprising clamps adapted for attachment to the forward ends of the sills 10 and themselves carrying means for attachment thereto of the inner or rear ends of the springs 19. As herein shown, each of these clamps comprises a pair of slotted clamp-bars 20 and 21 drawn together upon the sill 10 by tie-bolts 22. Slots 23 and 24 formed in one end of the clamp-bars 20 and 21 render the clamp adjustable to accommodate sills of varying widths. The upper clamp-bars 20 are also slotted in a direction at right-angles to the slots 23 to receive the rear ends of the springs 19; said rear ends of the springs being provided with a series of apertures 25 adapted to be engaged by a screw 26 threaded through the slotted portion of the upper clamp-bar to confine the spring against displacement relatively to the clamp. The forward ends of the springs 19 are similarly apertured and engaged by the clamp-bolts 15 whereby to securely attach the collars 14 to the forward ends of said springs.

In the preferred arrangement herein shown the spring arms 19 are disposed widthwise in the vertical planes of the sills 10, and their rear ends are so curved that the portions thereof below and in advance of the points of attachment to the clamps abut directly against the joints at the forward extremities of the side sills and vehicle springs, whereby the latter constitute the principal abutment to receive the thrusts of collision, and thus in a large measure relieve the clamps of such strains.

I claim—

1. In an automobile buffer, the combination of a buffer-bar, S-shaped springs disposed widthwise in vertical planes and constituting supporting and carrying arms for said buffer-bar, said springs being apertured at their rear ends, clamp-collars in which said buffer-bar is directly mounted, said clamp-collars being provided with means for securing the forward ends of said springs thereto, clamps adapted for application to the side sills of an automobile frame, said clamps having slots receiving the rear apertured ends of said springs, and screws engaging said clamps and the apertures of said springs whereby to secure the rear ends of the latter in said clamps, substantially as described.

2. In a buffer for use upon an automobile having side sills and vehicle springs jointed at their forward extremities, the combination of a buffer-bar, S-shaped springs constituting supporting and carrying arms for said buffer-bar, means for attaching said S-shaped springs at their forward ends to said buffer-bar, and means for attaching said S-shaped springs at their rear ends to said side sills, said S-shaped springs being disposed widthwise in the vertical planes of the side sills and abutting against the joints at the forward extremities of said side sills and vehicle springs, substantially as described.

3. In an automobile-buffer, the combination of a buffer-bar, clamp-collars in which said buffer-bar is mounted, said clamp-collars each having a pair of apertured lugs one of which is formed with a slot intersecting the aperture thereof, springs constituting supporting and carrying arms for said buffer-bar and having apertured forward ends engaging said slots, clamp-bolts passed through said apertured lugs and spring ends, and means for securing the inner ends of said springs to the vehicle, substantially as described.

4. In a buffer for use upon an automobile having side sills and vehicle springs jointed at their forward extremities, the combination of a buffer-bar, S-shaped springs constituting supporting and carrying arms for said buffer-bar, means for attaching said S-shaped springs at their forward ends to said buffer-bar, clamps embracing said side sills, and means for attaching the rear ends of said S-shaped springs to the upper sides of said clamps, the said S-shaped springs below their points of attachment to said clamps abutting against the joints at the forward extremities of said side sills and vehicle springs, substantially as described.

ALLAN L. McGREGOR.

Witnesses:
LOIS FORCE,
SAMUEL N. POND.